(12) United States Patent
Pieczynski

(10) Patent No.: US 7,343,708 B2
(45) Date of Patent: Mar. 18, 2008

(54) ICE FISHING TIP-UP DISPLAY

(76) Inventor: Darren Edward Pieczynski, N9460 Koskela Rd., Wakefield, MI (US) 49968

( * ) Notice: Subject to any disclaimer, the term of this patent is extended or adjusted under 35 U.S.C. 154(b) by 0 days.

(21) Appl. No.: 10/066,267

(22) Filed: Feb. 2, 2002

(65) Prior Publication Data

US 2003/0145508 A1    Aug. 7, 2003

(51) Int. Cl.
*A01K 97/12*    (2006.01)
(52) U.S. Cl. .......................................... 43/17
(58) Field of Classification Search .................. 43/16, 43/17
See application file for complete search history.

(56) References Cited

U.S. PATENT DOCUMENTS

| | | | | |
|---|---|---|---|---|
| 3,352,048 A | * | 11/1967 | Fleming | 43/17 |
| 4,928,419 A | * | 5/1990 | Forrestal | 43/17 |
| 4,934,090 A | * | 6/1990 | Storey et al. | 43/16 |
| 4,980,986 A | * | 1/1991 | Harper | 43/17 |
| 5,067,269 A | * | 11/1991 | Eppley et al. | 43/17 |
| 5,074,072 A | * | 12/1991 | Serocki et al. | 43/16 |
| 5,097,618 A | * | 3/1992 | Stoffel | 43/17 |
| 5,488,796 A | * | 2/1996 | Taylor et al. | 43/17 |
| 5,523,589 A | * | 6/1996 | Edmond et al. | 257/103 |
| 5,855,084 A | * | 1/1999 | Huddleston et al. | 43/17 |
| 5,867,933 A | * | 2/1999 | Walker | 43/17 |
| 5,979,101 A | * | 11/1999 | Muenchow | 43/17 |
| 6,105,300 A | * | 8/2000 | Abdo | 43/17 |

* cited by examiner

*Primary Examiner*—Kurt Rowan
(74) *Attorney, Agent, or Firm*—Weiner & Burt, P.C.; Irving M. Weiner; Pamela S. Burt

(57) ABSTRACT

An apparatus for indicating an ice fishing tip-up strike or mark trails in low light conditions by a flashing light source located on extreme end of apparatus includes a tilt switch to determine whether flag arm is in horizontal or vertical position. A reflective enclosure of the tilt switch/flashing light source is used to protect the electrical connections of conductors, tilt switch and flashing light source. Conductors connect the power source via a jack/socket junction to apply and disconnect power from the flashing light source. The apparatus is attached to a flag arm of existing known fishing devices.

1 Claim, 4 Drawing Sheets

ICE FISHING TIP-UP DISPLAY

BACKGROUND OF THE INVENTION

This invention relates generally to the field of ice fishing tip-up lights, and more particularly to an apparatus for indicating an ice fishing tip-up strike with dual usage of marking trails in low light conditions by a flashing light source and reflective body.

Since the time ice fishing tip-ups and like devices have been in use, there have been numerous ways users have made a strike apparent after daylight hours. Common indicators on tip-ups are flags, some equipped with lights. Flags that are used with devices are not easily seen in the dark and therefore have been equipped with lights. The lights that are used with these devices are constantly burning type that are usually white/clear or red in color. The lights are turned to the on position in different ways, though all in conjunction with a flag moving into a vertical upright position. U.S. Patents Thiel U.S. Pat. No. 2,785,493, Whitacre U.S. Pat. No. 2,786,294, and Dumar U.S. Pat. No. 4,727,673 are examples of existing devices that include a light to indicate a fish strike on tip-ups.

Theil's light uses a mechanical connection of the flag itself to complete a circuit to light a bulb when the flag is in the upright position. Whitacre's light itself slides down th flag staff into a socket to make the electrical connection to light a bulb. Dumar's light uses a modified conventional flashlight to act as the light source. The flashlight is mounted to the base of the tip-up and when the flag moves to the upright position, a circuit blocking piece of material is removed thereby completing the circuit to light the flashlight.

Common indicators in existence are not easily portable, if at all, from one type of tip-up to another. They are not self-contained, weather-tight assemblies, and are often mechanical. These mechanical connections can produce poor connections due to elements of weather and corrosion.

The constant burning type lights used can be confused with headlights and taillights of vehicles traveling on a frozen lake. A constant burning light draws 100% of its power consumption at all times, so the power source life can be short lived. These indicators are also currently limited in color options so that ownership of a tip-up with a strike may be falsely identified in heavily fished areas such as tournaments.

The lights that are specified by the patent examples listed are located on places of the tip-up other than the extreme end of the flag, limiting their visibility. The weight of these existing devices would be more than the strength of flag springs can raise to the upright position.

Tip-up lights by design have been single purpose devices, i.e., to indicate a fish strike on a tip-up during poor visibility. When the flag is down, these lights are not illuminated and location of the fishing apparatus is difficult to locate. The locations of tip-ups on frozen lakes are at times marked with a snow pile, stick, or small tree branch next to the device. These are not easily seen themselves and the fishing equipment is left vulnerable to damage by motorized vehicles traveling on a frozen lake.

BRIEF SUMMARY OF THE INVENTION

An object of the invention is to provide a flashing light source indicator.

A further object of the invention is to improve visibility of the light.

Yet another object of the invention is to consume less power, providing longer battery life.

Yet another object of the invention is to provide a design that may be used on multiple tip-up designs.

Still yet another object of the invention is to provide multicolor options so fisherman can identify their fish strikes when fishing with friends or highly populated fishing areas such as tournaments where multiple lighted tip-ups may be in use.

Another object of the invention is it may be used to mark trails at night either powered by a flashing indicator, or un-powered by a reflective case.

In accordance with a preferred embodiment of the present invention, an ice fishing tip-up display comprises a flashing light source located at one end of an assembly; a tilt switch to determine whether a flag arm is in generally horizontal or generally vertical position; a reflective enclosure of said tilt switch/flashing light source; conductors to carry electrical properties from a power source to said flashing light source; a power source and circuitry means to supply power to said flashing light source; and an attaching apparatus to attach to a flag arm of a fishing device.

Other objects and advantages will become apparent from the following descriptions, taken in connection with the accompanying drawings, wherein, by way of illustration and example, an embodiment of the present invention is disclosed.

BRIEF DESCRIPTION OF THE SEVERAL DRAWINGS

The drawings constitute a part of this specification and include exemplary embodiments to the invention, which may be embodied in various forms. It is to be understood that in some instances various aspects of the invention may be shown exaggerated or enlarged to facilitate an understanding of the invention.

DETAILED DESCRIPTION OF THE PREFERRED EMBODIMENTS

Detailed descriptions of the preferred embodiments are provided herein. It is to be understood, however, that the present invention may be embodied in various forms. Various aspects of the invention may be inverted, or changed in reference to specific part shape and detail, part location, or part composition. Therefore, specific details disclosed herein are not to be interpreted as limiting, but rather as a basis for the claim and as a representative basis for teaching one skilled in the art to employ the present invention in virtually any appropriately detailed system, structure or manner.

Figure 2:
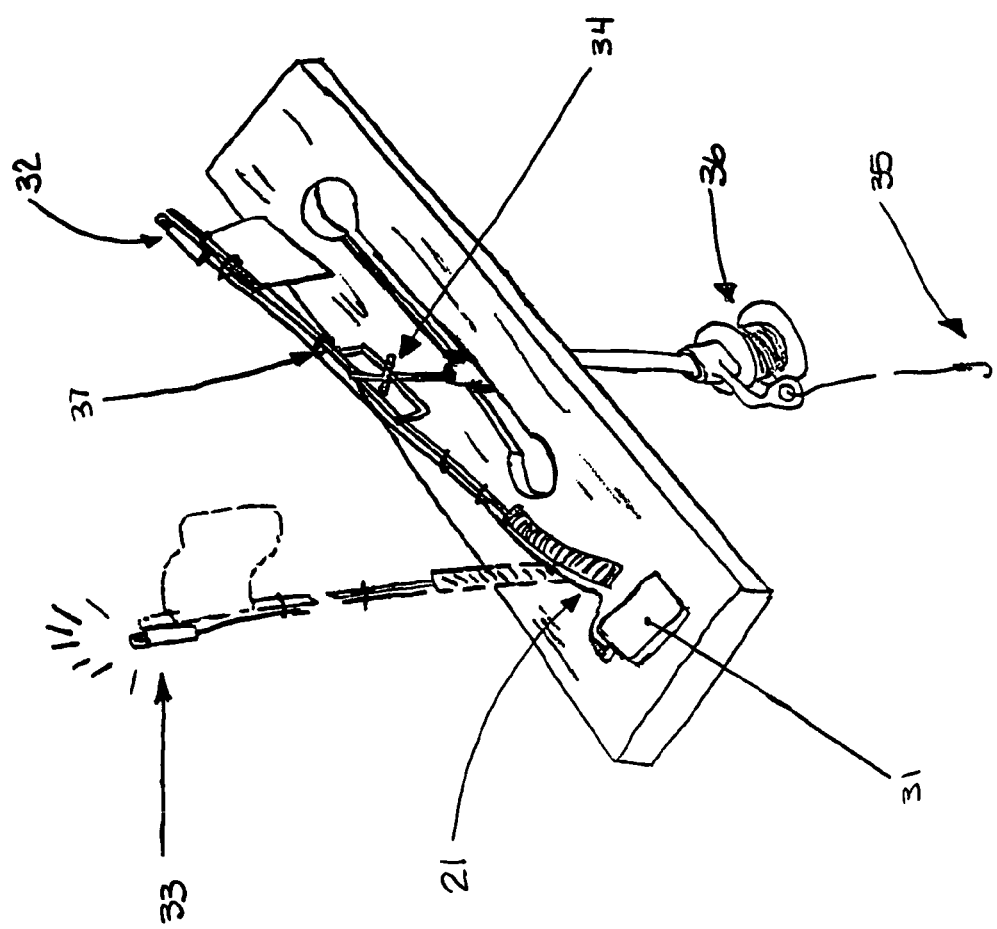
FIG. 2 is a perspective view of FIG. 1 displaying usage on an ice fishing tip-up.

With reference to the drawings, an ice fishing apparatus is shown generally in FIG. 2. The apparatus is of the tip-up variety such as disclosed in U.S. Pat. No. 2,654,176 issued to Kachelski, et al., incorporated herein by reference, and will hereby be the reference for the description of a tip-up apparatus. As the apparatus spans an ice fishing hole, hook 35, sometimes baited, entices a fish to strike. Once the bait is taken and line is spooled out from spool 36, assembly 34 will then spin releasing the flag to the upright position. This chain of events is well known in the art. To accomplish an important function of the invention, there is further shown in FIG. 2 the present invention utilized on the tip-up. Detachable power pack 31 is connected via conductors 21 to tilt switch/flashing light assembly 32. Removable fasteners 37 are used to attach the conductors 21 and flashing light assembly to the flag pole. After a fish strike and chain of events as stated previously, the flag pole carrying the flag and flashing light assembly will swing to upright position 33, activating the flashing light by means of a tilt switch. The tilt switch is preferably of the mercury variety though may be gravity activated or mechanical wherein the switch completes the electrical circuit to the flashing light source.

Figure 1:
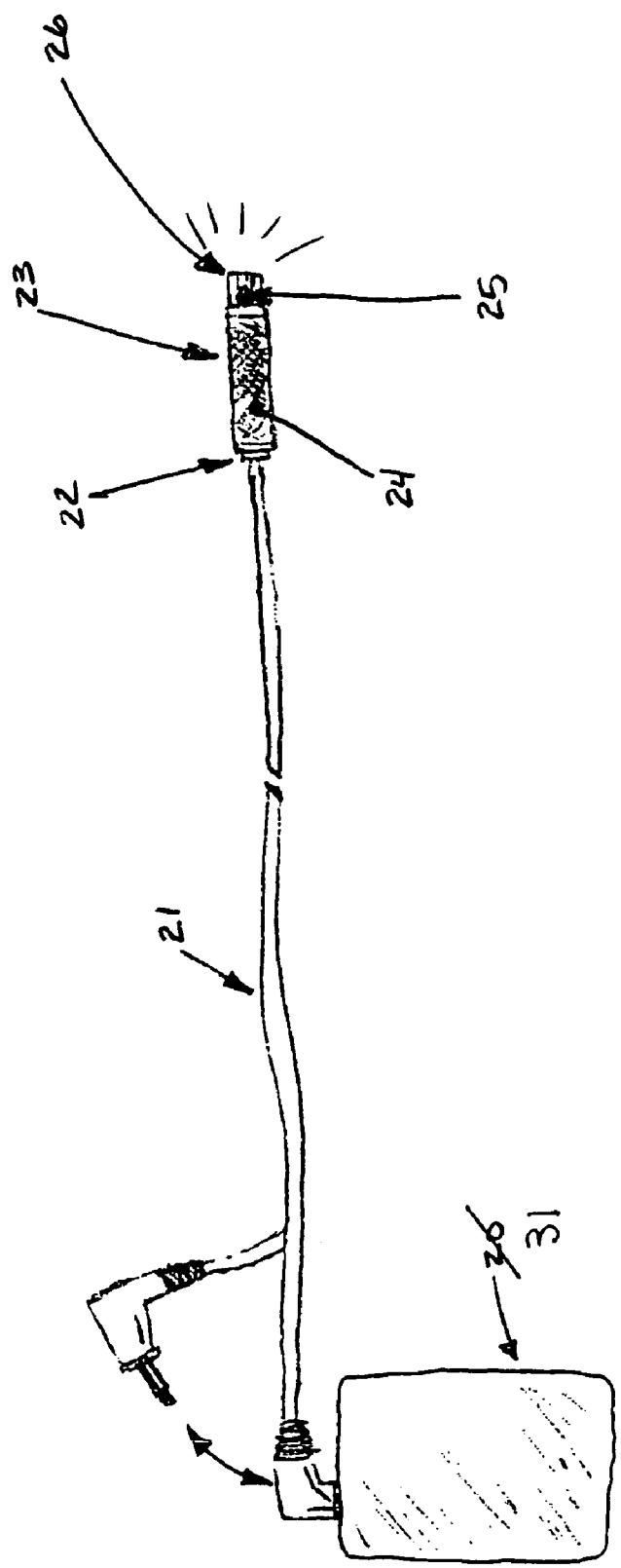
FIG. 1 is a perspective view of an ice fishing tip-up display in accordance with a preferred embodiment of the present invention.

FIG. 1 displays a preferred embodiment as utilized in FIG. 2. Removable power source 31 can be stored on ones person awaiting low light conditions to arm the flashing light source. Power source 31 is connected to the flashing light source via cord 21, having a jack in which to connect the electrical property means to the flashing light source. Cord 21 conductors are fed into weather tight tubular enclosure 23, and sealed with rubber bushing 22. Enclosure 23 is surrounded with a high grade weather resistant reflective membrane 24. Enclosure 23 acts as a weather tight enclosure to protect further circuitry, tilt switch and flashing light 25, and all electrical connections thereof. 360 degree lens 26 covers the flashing light assembly providing a weather tight seal at the extreme end of the apparatus. Lens 26, when present invention is mounted to a tip-up, is located at the highest point to become a flashing beacon when flag pole is in upright, vertical position (post fish strike).

It is another feature that the enclosure be reflective. The reflective material acts as an indicator performing multiple functions. First, when the ice fishing tip-up is in place spanning a hole with the flag down awaiting a fish strike, it is vulnerable to motorized traffic on a frozen lake. The operators may see the fisherman though be unaware of the locations of the fisherman's equipment. When shined upon by the vehicle's light source, the reflective enclosure will illuminate, indicating the location of the equipment allowing the operator to steer clear. Another function is when the fisherman awaits a fish strike on the tip-up, the fisherman may scan the area with a flashlight or like device to verify the locations of the equipment. This is especially helpful during time to pick up the equipment before exiting the fishing location. The enclosure is mounted with its length parallel to the flag pole, so that a fisherman may tell the flag position, horizontal or flag down and vertical flag up, by use of a flashlight or like device simply by shining the tip-up and determining the position of the reflective material. This is especially helpful if the unit is unarmed without the power source or if electronic failure occurs, so that the fisherman can still determine the flag position.

It is further a feature that the light is of the flashing variety. A fisherman may observe many lights on a frozen lake in darkness, whether lights from taillights, houses or other fisherman. The flashing light provides a decisive indication of a fish strike on the fishing apparatus. The flashing light source may be of assorted colors so fisherman may use a specific color to help identify strikes on their equipment in heavily populated areas. The assorted colors may be of self-flashing colored LEDs (light emitting diodes), standard LEDs electrically pulsed to flash, multi-color LEDs, white LEDs, High Brightness Blue LEDs, and alike.

Figure 4:
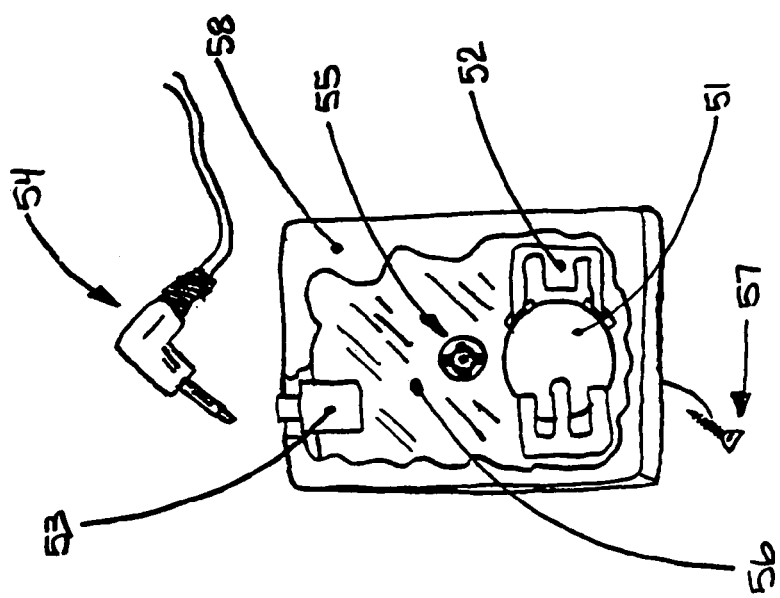
FIG. 4 is an internal cutaway view of the power source section of the invention.

To accomplish the means of sourcing electrical properties, in a preferred embodiment, to the flashing light source, FIG. 4 illustrates the detachable power unit with a cutaway view of case 58. Battery cell 51 is inserted in socket 52 that allows for battery replacement. Socket 52 is mounted to printed wiring board 56, including circuitry to supply electrical properties via a connector socket 53, protruding to the outside of case 58. Plug 54 may be connected and disconnected from this power access portal to carry the electrical properties to the flashing light source. In the embodiment shown in FIG. 4, case 58 is a two piece shell variety wherein it may be opened or closed for battery replacement and secured by screw 57. Screw 57 is inserted in the center of the two case halves 55, drawing them tight.

Figure 5:
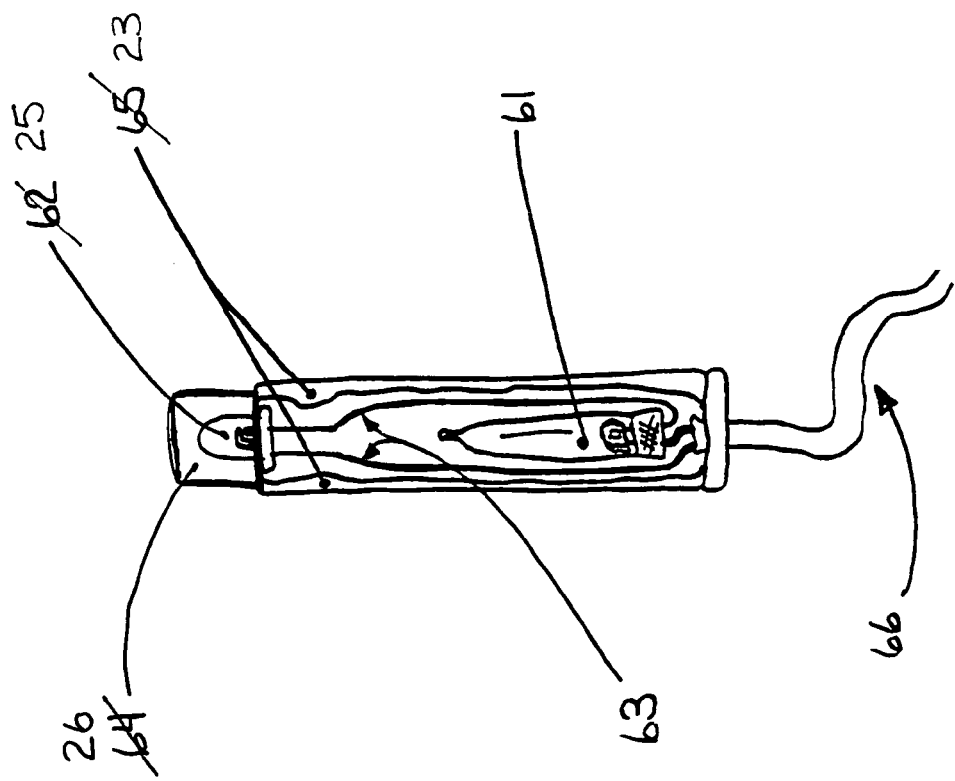
FIG. 5 is an internal cutaway view of the light source section of the invention.

FIG. 5 illustrates a cutaway view of tubular enclosure 23 of the flashing light source. In this embodiment, conductors surrounded by a protective coating 66, enter the enclosure where electrical connections 63 reside for the tilt switch 61 and flashing light 25. A view of lens 26 covers light 25.

Figure 3B:
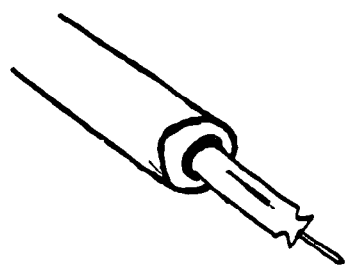
FIGS. 3A and 3B are perspective views of a cordless version of the invention.
Figure 3:
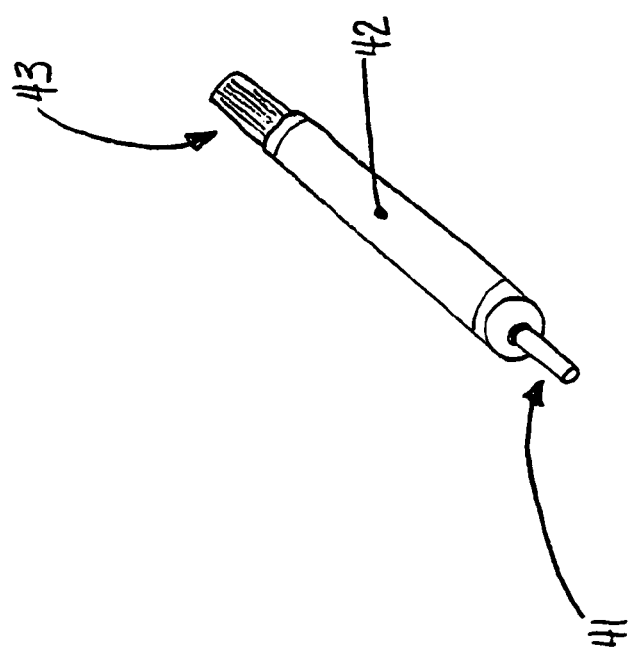
Figure 3A:
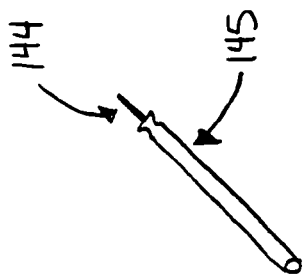

In the illustrated embodiment FIG. 3, a cordless version of the invention is shown. Tubular enclosure 42 is reflective and topped with lens 43. Pin type cell 41 supplies power to the unit. Cell 41 may be inserted into enclosure 42 in two directions. FIG. 3A exhibits a view of the pin type cell, positive pin 144 and negative pin 145. If pin type cell 41 is inserted positive pole first, internal connections would result in arming or powering the device awaiting tilt activation. If the cell is inserted in the opposite direction, partial view FIG. 3B, the positive and negative poles of the cell will be outside the unit disarming the apparatus, though sealing the hole and operating as a holder for the cell.

In accordance with another aspect, the apparatus may be used to mark trails in low light conditions. The invention is easily removable from a tip-up fishing apparatus. Once removed the apparatus may be hung in branches of trees or secured there for more permanent occupation. When mounted in the upright position and armed with the power source, the apparatus will flash indicating a specific location in the dark. Multiple units may be strung to create a marked pathway. This function is useful in many situations, one example being marking trails of hunters tracking wounded game or indicating the location of a downed animal. The invention possesses the reflective weather tight enclosure so that if the power source is not connected, the apparatus can be seen by an outside light source and shined upon to indicate a pathway or individual location.

The invention is a multipurpose apparatus performing a minimum of two uses as stated and limited only to the imagination of the user. The apparatus is small, lightweight, and weather resistant. As a flashing tip-up light the invention indicates fish strikes, position of tip-up flag, and protects the equipment it is attached to in low light conditions. The flashing light source may be of multiple colors allowing for choice by the user and flashes as an eye catching beacon. When removed the invention functions as a trail indicator or identifier in darkness.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

What is claimed is:

1. An ice fishing display device for use with a base assembly with a fishing line and a tip-up arm mounted to the base assembly, comprising:

a weatherproof reflective enclosure containing a flashing light source and a tiltable switch such that said flashing light source is electrically connected to said tiltable switch;

said enclosure having a lens at one end covering said flashing light source;

a reflective membrane surrounding said enclosure such that the display device can be seen by other operators;

an electrical cord connected to said enclosure at one end and having a plug at a second end;

said electrical cord having removable fasteners mounted along its length such that said electrical cord is attached to said tip-up arm;

said reflective enclosure mounted to an upper end of said tip-up arm;

a rubber bushing mounted at a second end of said reflective enclosure to seal said electrical cord to said electrical enclosure;

a power source detachably mounted to the base assembly;

said power source having a case containing a battery, a battery socket, and having a connector socket protruding outside of said case;

said battery socket mounted to a printed wiring board; and said electrical cord is connected to said power source by removably inserting said plug into said connector socket so that said power source can be changed;

whereby when a fish strikes, said tip-up arm is released from a lowered position and said tiltable switch electrically connects said power source to said enclosure so that said flashing light source illuminates to signal a user of a fish strike.

* * * * *